(12) United States Patent
Gümmer

(10) Patent No.: US 7,967,556 B2
(45) Date of Patent: Jun. 28, 2011

(54) TURBOMACHINE WITH MEANS FOR THE CREATION OF A PERIPHERAL JET ON THE STATOR

(75) Inventor: Volker Gümmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 11/159,296

(22) Filed: Jun. 23, 2005

(65) Prior Publication Data
US 2006/0104805 A1  May 18, 2006

(30) Foreign Application Priority Data

Jun. 24, 2004 (DE) .................. 10 2004 030 597

(51) Int. Cl.
*F04D 29/68* (2006.01)
(52) U.S. Cl. ........ 415/144; 415/58.7; 415/160; 415/914
(58) Field of Classification Search .............. 415/54.1, 415/58.4, 58.5, 58.7, 144, 151, 160, 191, 415/209.3, 211.2, 914; 60/782, 785, 795
See application file for complete search history.

(56) References Cited

U.S. PATENT DOCUMENTS

| | | | |
|---|---|---|---|
| 2,690,293 A * | 9/1945 | Muhlberg | |
| 2,393,042 A * | 1/1946 | Hagen | |
| 2,489,683 A * | 11/1949 | Stalker | 60/726 |
| 2,653,754 A * | 9/1953 | McDonald | |
| 2,837,270 A * | 6/1958 | Chapman | 415/17 |
| 2,933,238 A | 4/1960 | Stalker | |
| 3,066,912 A * | 12/1962 | Scheper, Jr. | 415/121.2 |
| 3,572,960 A | 3/1971 | McBride | |
| 3,694,102 A * | 9/1972 | Conrad | 415/115 |
| 3,846,038 A * | 11/1974 | Carriere et al. | |
| 3,993,414 A * | 11/1976 | Meauze et al. | |
| 4,146,352 A * | 3/1979 | Yasugahira et al. | 415/144 |
| 4,155,680 A | 5/1979 | Linko | |
| 4,362,465 A * | 12/1982 | Riollet et al. | 415/144 |
| 4,415,310 A * | 11/1983 | Bouiller et al. | |
| 4,642,027 A | 2/1987 | Popp | |

(Continued)

FOREIGN PATENT DOCUMENTS

CH 204 331 A * 4/1939
(Continued)

OTHER PUBLICATIONS

European Search Report dated Oct. 16, 2009 from counterpart European patent application.

*Primary Examiner* — Nathaniel Wiehe
(74) *Attorney, Agent, or Firm* — Timothy J. Klima; Shuttleworth & Ingersoll, PLC

(57) ABSTRACT

A turbomachine has at least one stator (4) and at least one downstream rotor (7), with the stator (4) being provided with stationary stator blades and the rotor (7) comprising several rotor blades attached to a rotating shaft. A casing (2) confines the passage of fluid through the rotor (7) and the stator (4) in the outward direction. A mechanism for peripheral jet creation is provided in the area of at least one vane of the stator (4), with at least one nozzle (21) issuing fluid at the radially outer boundary of a main flow path.

18 Claims, 18 Drawing Sheets

U.S. PATENT DOCUMENTS

| | | | |
|---|---|---|---|
| 4,883,404 A * | 11/1989 | Sherman | |
| 5,059,093 A | 10/1991 | Khalid | |
| 5,203,162 A | 4/1993 | Burge | |
| 5,230,605 A * | 7/1993 | Yamaguchi et al. | 415/151 |
| 5,327,716 A * | 7/1994 | Giffin et al. | |
| 5,458,457 A | 10/1995 | Goto et al. | |
| 5,472,314 A * | 12/1995 | Delonge | |
| 5,480,284 A | 1/1996 | Wadia | |
| 5,762,034 A * | 6/1998 | Foss | 123/41.49 |
| 5,876,182 A | 3/1999 | Schulte | |
| 6,109,868 A | 8/2000 | Burlman | |
| 6,125,626 A * | 10/2000 | El-Aini | |
| 6,302,640 B1 | 10/2001 | McKelvey | |
| 6,574,965 B1 | 6/2003 | Feulner | |
| 6,585,479 B2 * | 7/2003 | Torrance | 415/58.5 |
| 6,663,346 B2 * | 12/2003 | Munsell et al. | |
| 7,097,414 B2 * | 8/2006 | Stangeland | 415/58.4 |
| 2003/0026695 A1 | 2/2003 | Schmuecker | |
| 2004/0081552 A1 | 4/2004 | Gummer | |
| 2005/0019152 A1 | 1/2005 | Seitz | |
| 2005/0226717 A1* | 10/2005 | Xu | 415/58.5 |
| 2006/0104805 A1 | 5/2006 | Gummer | |
| 2008/0298951 A1* | 12/2008 | Brault et al. | 415/58.5 |

FOREIGN PATENT DOCUMENTS

| | | | |
|---|---|---|---|
| CH | 275562 | | 5/1951 |
| DE | 1042828 | | 11/1958 |
| DE | 976 186 C | * | 4/1963 |
| DE | 1428188 | | 11/1968 |
| DE | 19 64 057 A1 | * | 7/1970 |
| DE | 2352236 | | 4/1975 |
| DE | 3407945 | | 9/1985 |
| DE | 44 38 184 A | | 4/1996 |
| DE | 19632207 | | 2/1998 |
| DE | 10135003 C1 | | 10/2002 |
| DE | 10233032 | | 1/2004 |
| DE | 10330084 A1 | | 3/2004 |
| EP | 0 633 392 A | * | 6/1961 |
| EP | 0606475 | | 7/1994 |
| EP | 0497574 B1 | | 9/1995 |
| EP | 0718469 B1 | | 12/1995 |
| EP | 0719908 B1 | | 3/2000 |
| EP | 1013937 | * | 6/2000 |
| EP | 1 286 022 A | * | 2/2003 |
| EP | 1286022 | * | 2/2003 |
| FR | 1 263 010 A | * | 6/1961 |
| FR | 1 454 266 A | * | 7/1966 |
| GB | 619722 | | 3/1949 |
| GB | 987625 | | 3/1965 |
| GB | 2 058 222 A | * | 4/1981 |

* cited by examiner

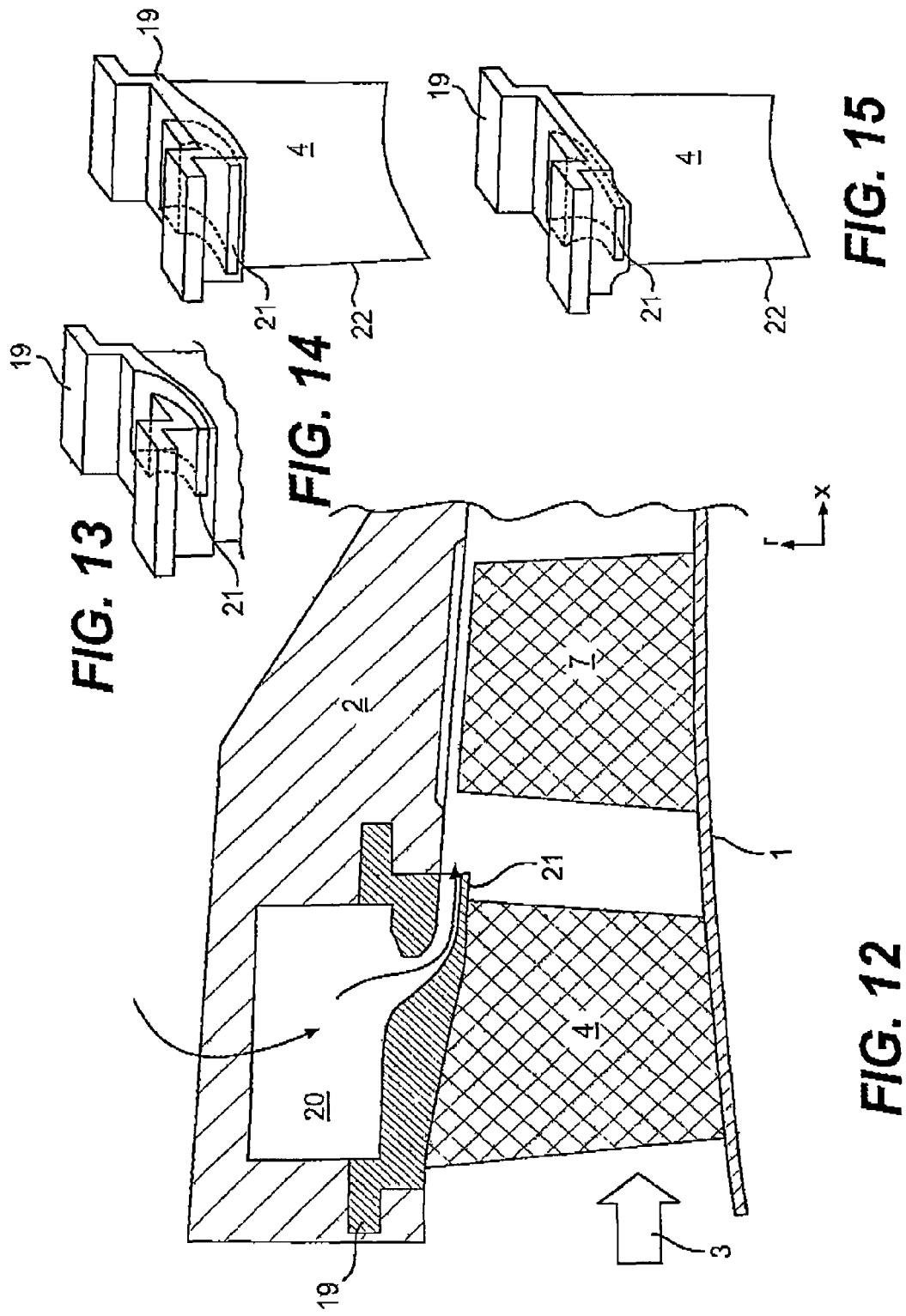

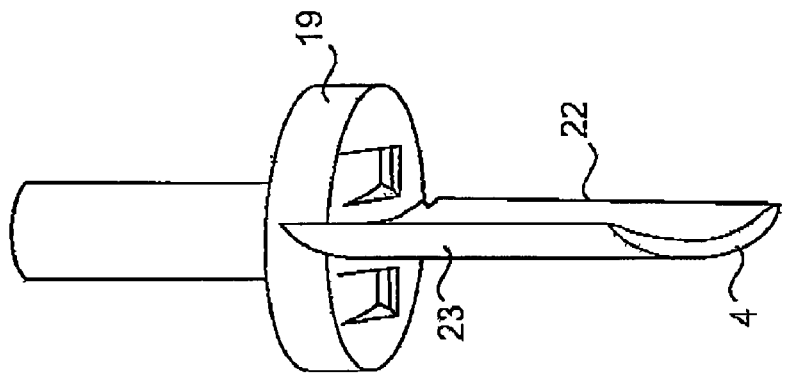
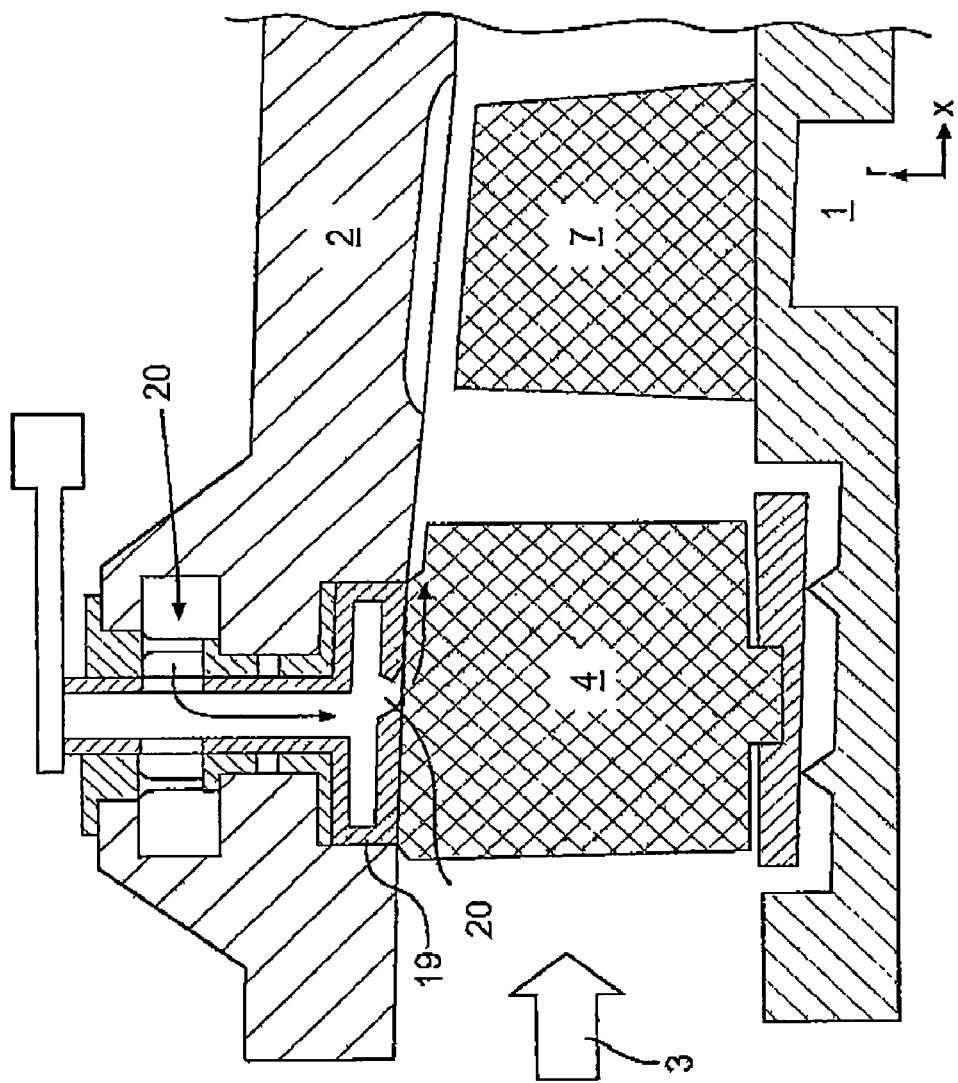
FIG. 23
FIG. 24

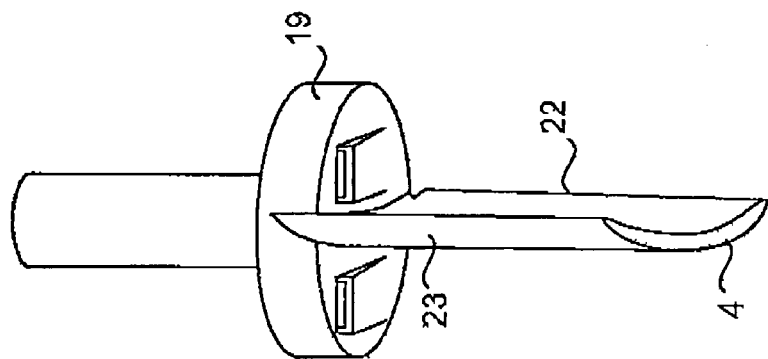
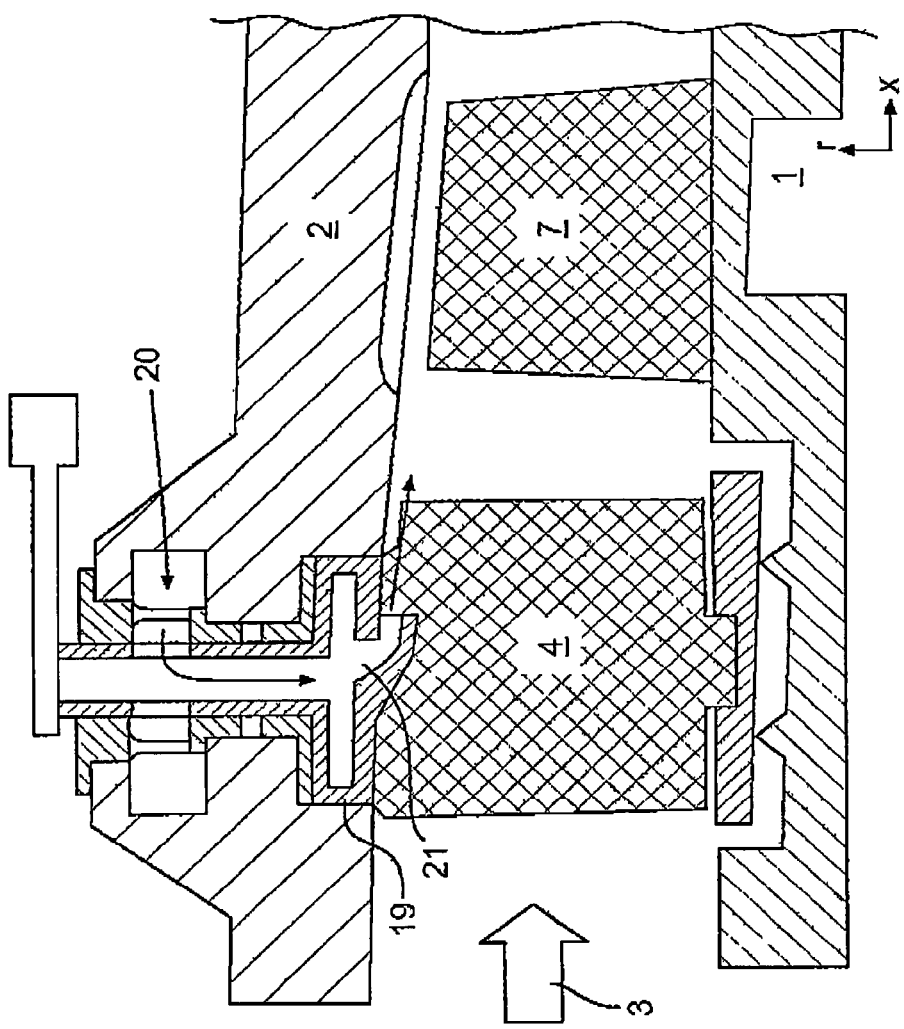
FIG. 26
FIG. 25

TURBOMACHINE WITH MEANS FOR THE CREATION OF A PERIPHERAL JET ON THE STATOR

This application claims priority to German Patent Application DE 10 2004 030 597.8 filed Jun. 24, 2004, the entirety of which is incorporated by reference herein.

BACKGROUND OF THE INVENTION

The present invention relates to a turbomachine in accordance with the features described below.

More particularly, this invention relates to a turbomachine with at least one stator and at least one downstream rotor, with the stator being provided with stationary stator blades and the rotor comprising several rotor blades attached to a rotating shaft. A casing exists which confines the passage of fluid through the rotor and the stator in the outward direction.

The aerodynamic loadability and the efficiency of turbomachines, for example, blowers, compressors, pumps and fans, is limited especially by the growth and the separation of boundary layers in the rotor tip area near the casing wall. The state of the art only partly provides solutions to this problem. While various concepts for the fluid supply on turbine blades exist, these are not applicable to turbomachines since they primarily serve for surface cooling, not for boundary layer energization. For rotors, a concept exists for the supply of air on the hub and casing via axially symmetrical slots to influence the wall boundary layers there. Finally, publications exist showing concepts in which rotors are blown by individual nozzles near the casing to favorably influence the radial gap flow there. Accordingly, the general concept of influencing the boundary layer by blowing in or supplying fluid is provided in the state of the start, but the known solutions are trivial, only partly effective and very limited in their practical applicability.

FIG. 1 shows a schematic representation of the state of the art of in-service turbomachinery in the example of a multi-stage configuration. The figure schematically shows a hub 1 and a casing 2 between which a fluid flow passes from the left-hand side, as indicated by the arrow 3. Furthermore, the figure illustrates two and a half stages of a multi-stage turbomachine in cutout view, here beginning with a stator 4 and ending with a stator 6. Arranged between the stators are the rotors 7 and 8. The first stators 4, 5 shown are variable (10) to provide for an adequate operating range of the turbomachine. In support of this and serving the same purpose, a fluid bleeding device 9 is provided between the stages. These design features incur high cost and constructional effort.

The state of the art is disadvantageous in that realizable turbomachines involve considerable cost and constructional effort to ensure an adequately wide operating range, in particular, at partial load. Simple existing concepts for blowing rotor tips are not compatible with a multi-stage design since they require additional space and do not satisfy the demands of operational safety.

BRIEF SUMMARY OF THE INVENTION

A broad aspect of the present invention is to provide a turbomachine of the type specified above which, while avoiding the disadvantages of the state of the art, is characterized by exercising a highly effective influence on the boundary layer due to a controlled and well-positioned creation of a peripheral jet and by high efficiency.

It is a particular object of the present invention to provide solution to the above problems by a combination of the characteristics described herein. Further advantageous embodiments of the present invention will become apparent from the description below.

The present invention accordingly provides means for the creation of a peripheral jet in the area of at least one stator vane by way of at least one nozzle issuing fluid at the radially outer boundary of a main flow path.

The present invention therefore relates to turbomachines, such as blowers, compressors, pumps and fans of the axial, semi-axial and radial type. The working medium or fluid may be gaseous or liquid.

The turbomachine according to the present invention can comprise one or several stages, each with one rotor and one stator.

According to the present invention, the rotor includes a number of blades which are connected to the rotating shaft of the turbomachine and impart energy to the working medium. The rotor can feature a free blade end or be provided with a shroud on the casing. According to the present invention, the stator includes a number of stationary blades with fixed blade ends on the casing side.

According to the present invention, the turbomachine may be provided with a special type of stator upstream of the first rotor, a so-called inlet guide vane assembly.

In accordance with the present invention, at least one stator or inlet guide vane assembly, instead of being fixed, can be rotatably borne to change the angle of attack. A shaft accessible from the outside of the annulus can, for example, accomplish such a variation.

The turbomachine may, in a special form, also be provided with at least one row of variable rotors.

In accordance with the present invention, the turbomachine may alternatively also have a bypass configuration, with the single-flow annulus dividing into two concentric annuli behind a certain blade row, with each of these annuli housing at least one further blade row.

More particularly, the present invention provides for a turbomachine which comprises means for the creation of a peripheral jet in the area of at least one vane of a stator row such that the exit opening (nozzle) required for the creation of the jet at the outer boundary of the main flow path is embedded in a stator component or is at least partly confined by a stator component.

BRIEF DESCRIPTION OF THE DRAWINGS

The present invention is more fully described in light of the accompanying drawings showing preferred embodiments. In the drawings, FIGS. 23-24 show an arrangement in accordance with the present invention with stator-embedded nozzle (wall-flush) and fluid supply via the actuating shaft of the stator, meridional view and perspective view of the stator, FIGS. 25-26 show an arrangement in accordance with the present invention with stator-embedded nozzle (protruding) and fluid supply via the actuating shaft of the stator, meridional view and perspective view of the stator.

DETAILED DESCRIPTION OF THE INVENTION

Figure 1:
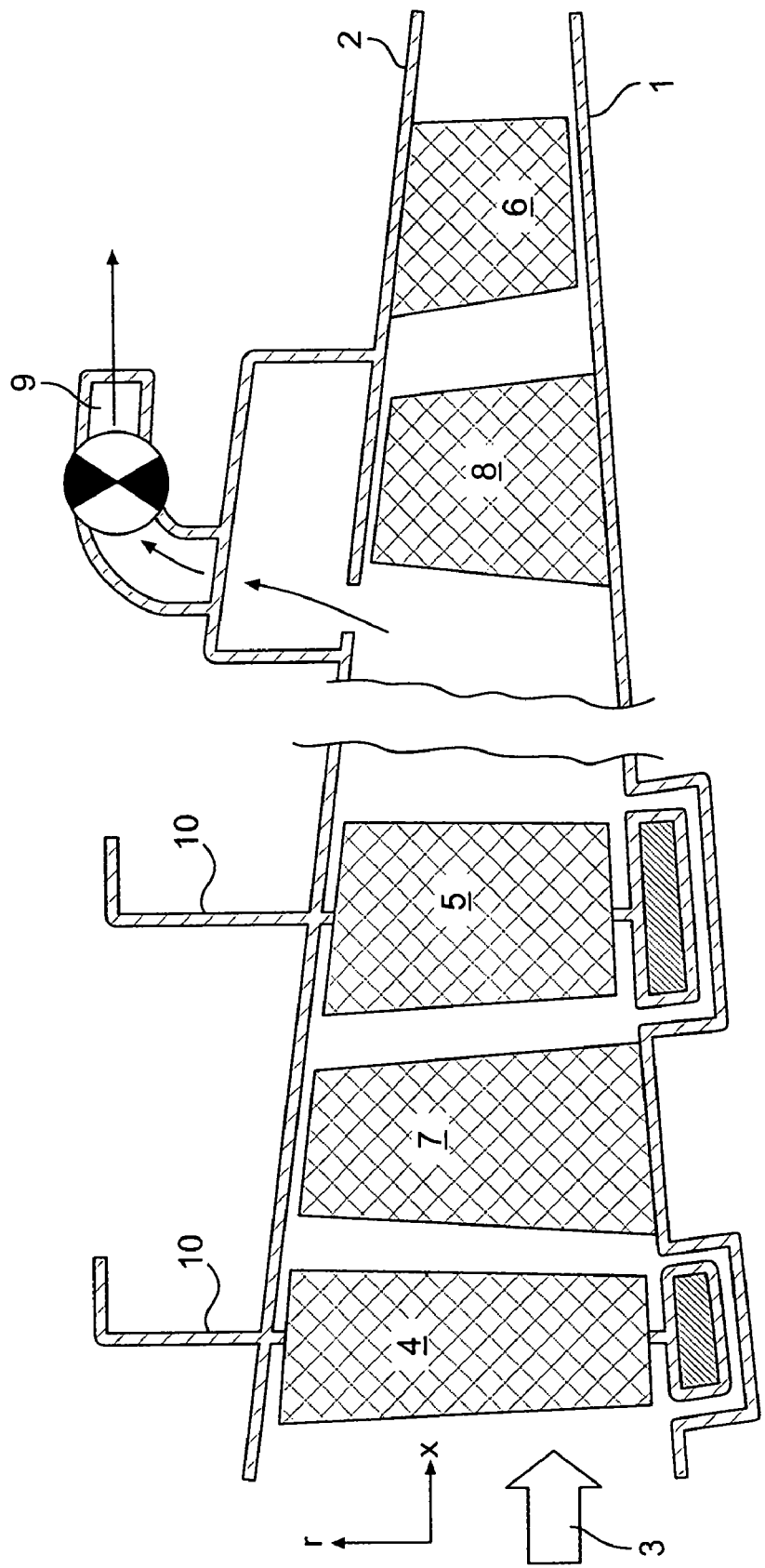
FIG. 1 is a schematic representation of the state of the art.
Figure 2:
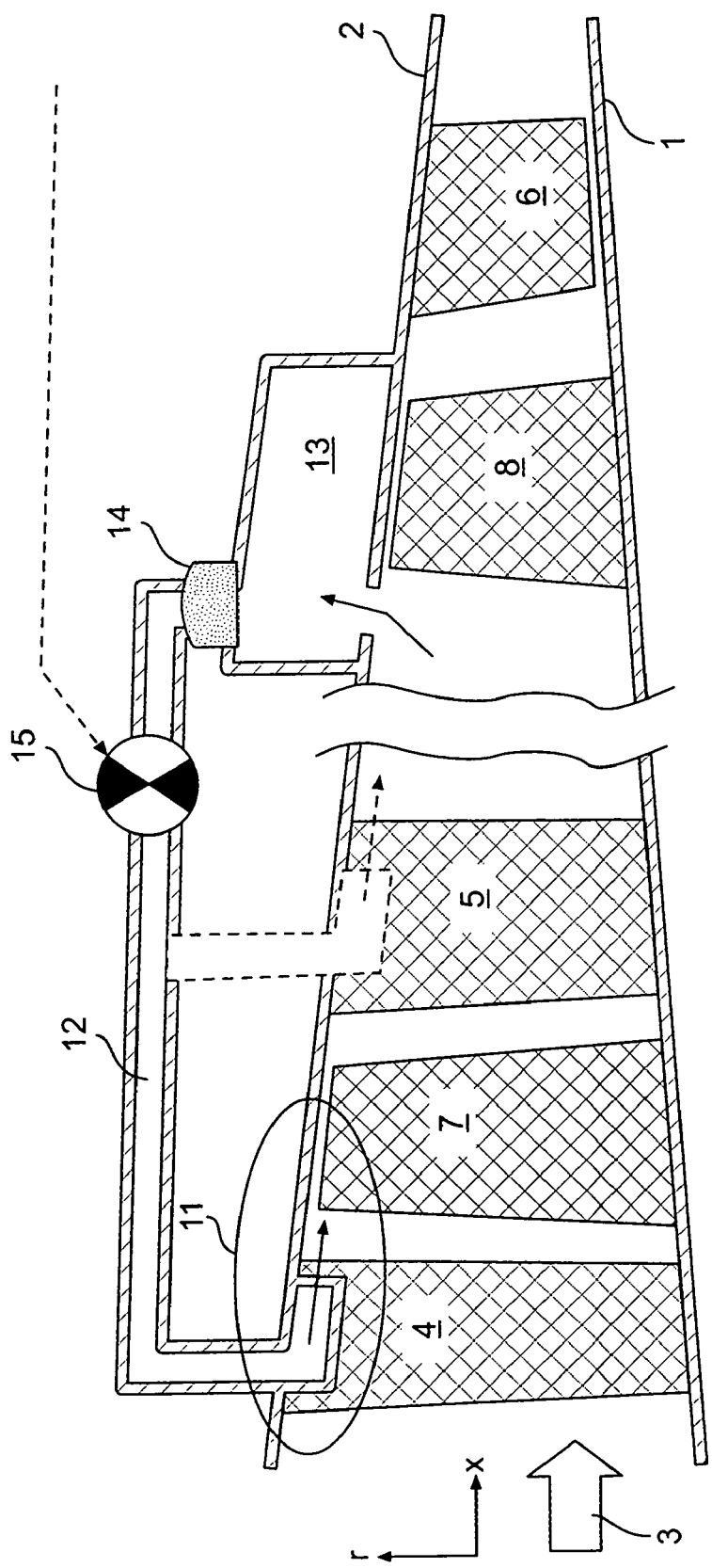
FIG. 2 is a schematic representation of the basic concept in accordance with the present invention.
Figure 3:
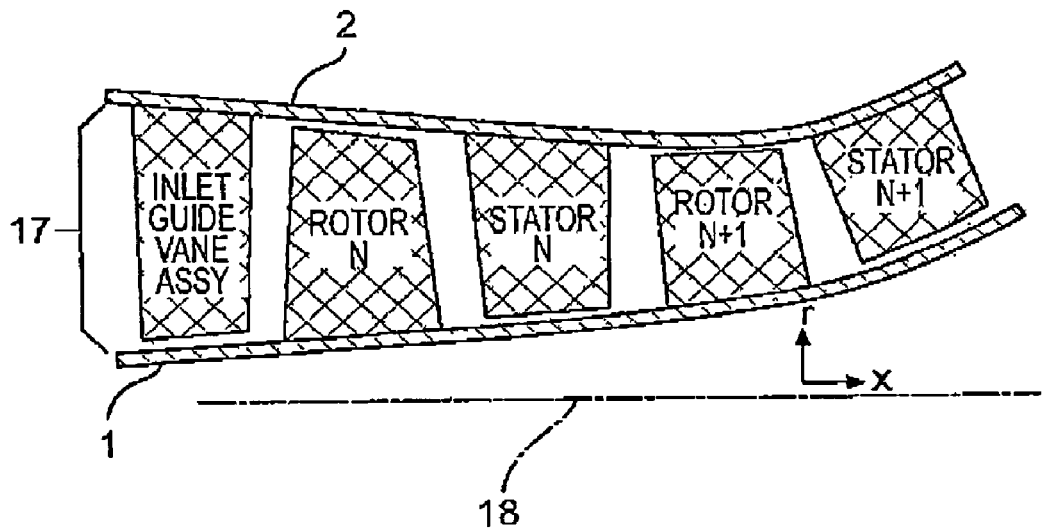
FIGS. 3-6 show different variants and configurations of the turbomachine in accordance with the present invention.
Figure 4:
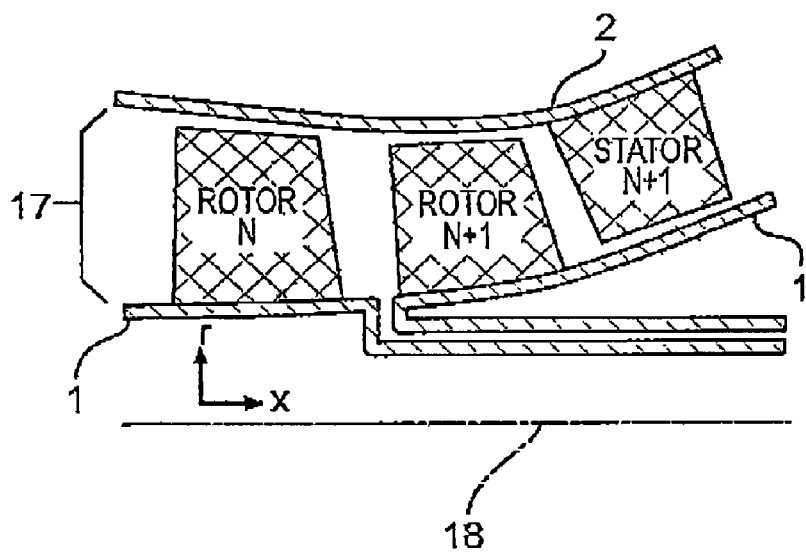
Figure 5:
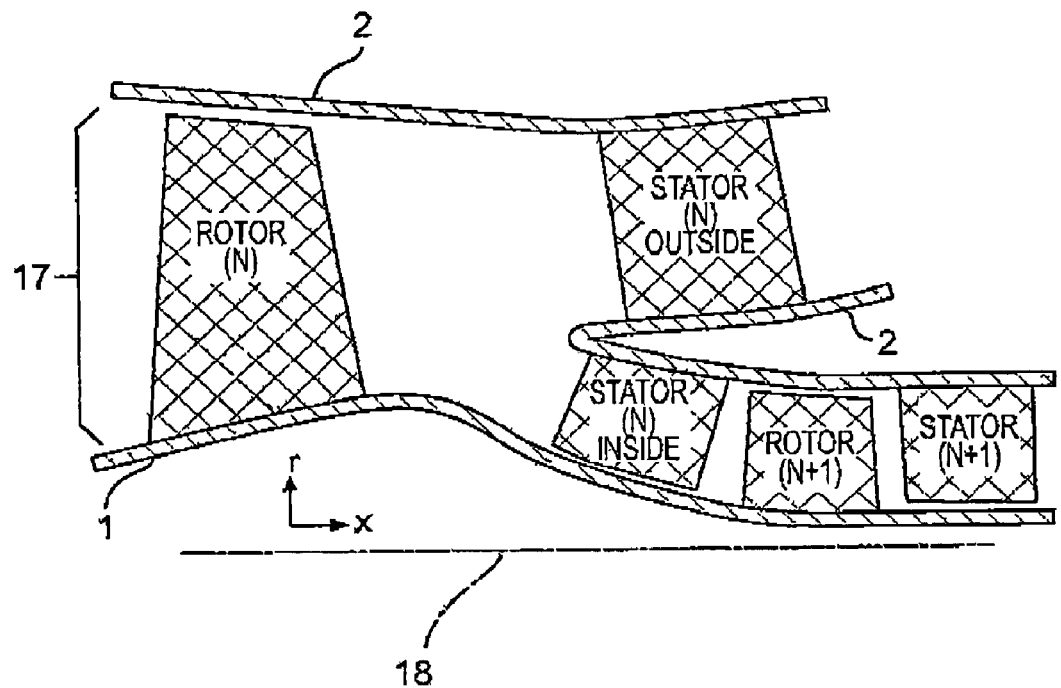
Figure 6:
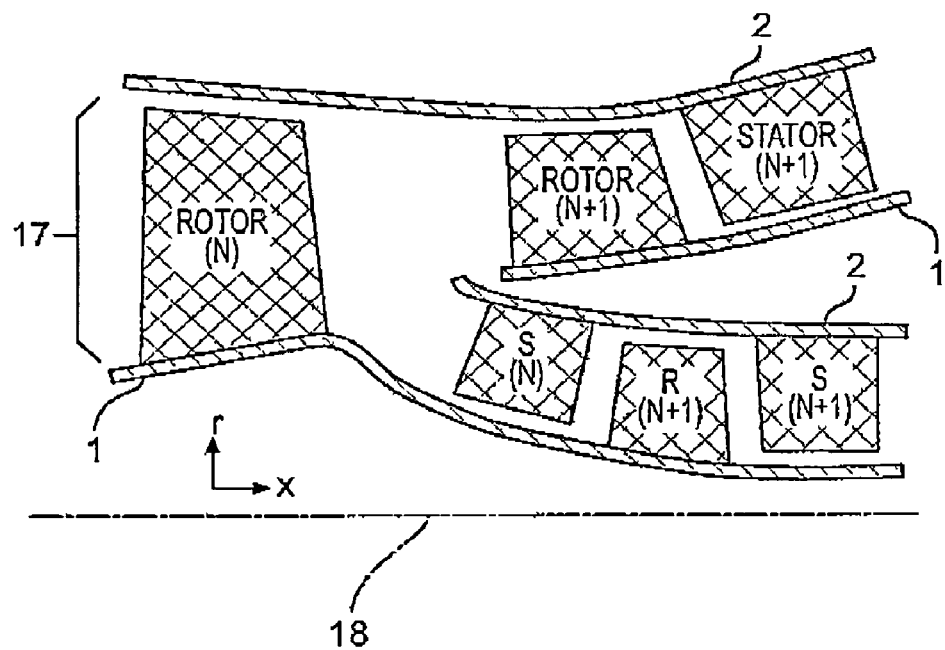

FIG. 2 shows a highly simplified illustration of the inventive solution by way of a cutout of a multi-stage turbomachine. The core of the inventive solution is the device for the creation of a fluid jet which originates at the periphery of the main flow path and essentially parallels the casing, with this device being provided in the area of at least one stator 4 and constructionally integrated into the design of the stator (stator-integrated peripheral jet creation 11). This functional unit may, in a particular form according to the present invention, connect to, and be fed from, a point located further downstream in the main flow path (e.g. a chamber 13 for interstage bleed) via a flow passage (line 12). In a further particular form, a freely designable filter device 14 is provided in the route of the return line. In another particular form, a throttling device 15 or a controllable valve is provided in the route of the return line. This can be actuated by a mechanism of existing variable stators, as indicated by the broken arrow. In still another particular form, control of the valve 15 is provided by way of a freely designable, mechanical or hydraulic connection to an existing mechanism 16 for the actuation of variable stators. Thus, control can be effected in a simple way in dependence of the rotor speed.

FIGS. 3-6 show four of a multitude of possible configurations of the turbomachine according to the present invention. Shown is an annulus which is flown from the left to the right-hand side and the machine axis 18 around which a rotor drum (hub 1) rotates. In the examples shown in FIGS. 4 and 6, a further rotor drum (hub 1) is provided. The rotors, stators and the inlet guide vane assembly are each shown in schematic representation.

Figure 7B:
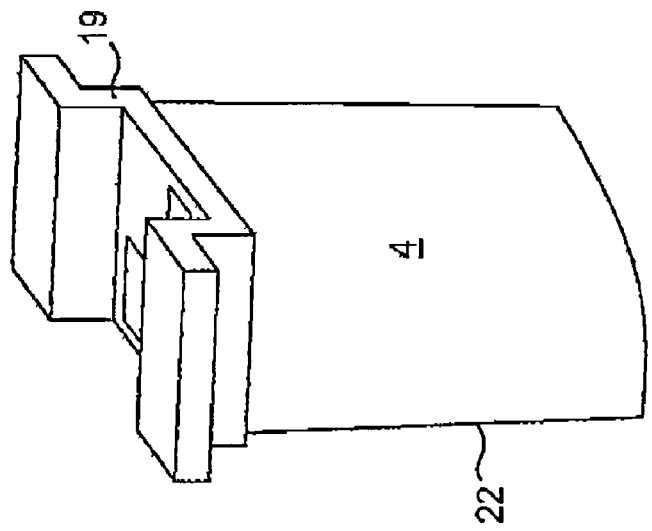
FIGS. 7a-7b show an arrangement in accordance with the present invention with stator-embedded nozzle (wall-flush) and fluid supply via the stator root, meridional view and perspective view of the stator.
Figure 7A:
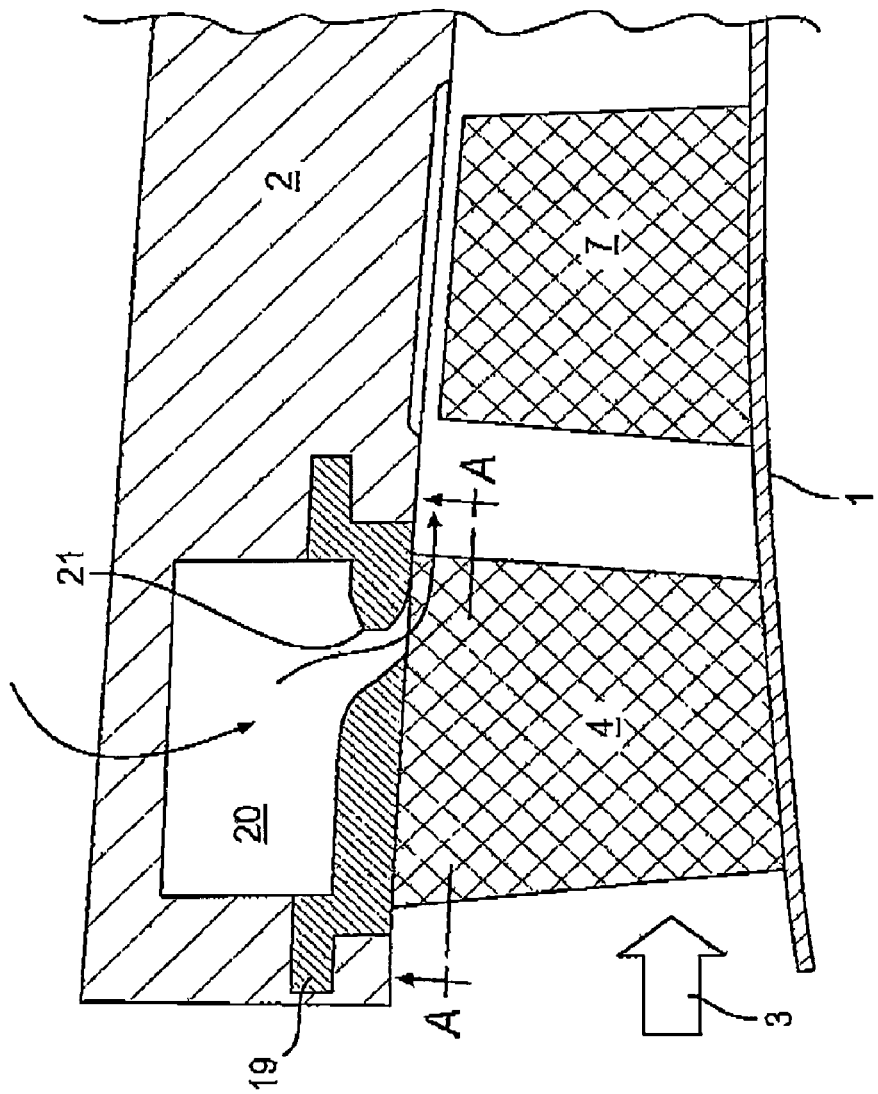
Figure 9:
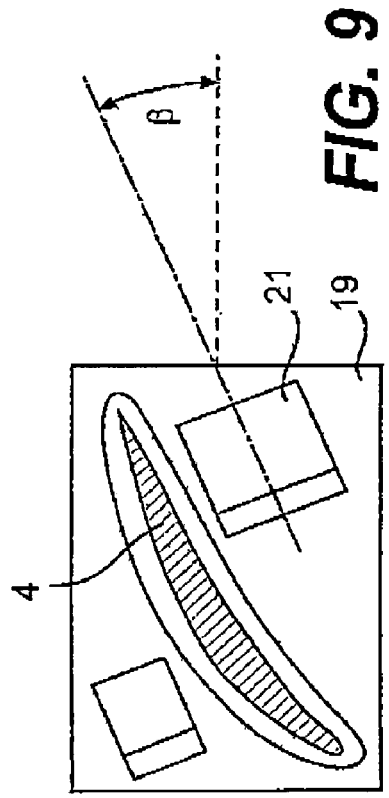
FIGS. 8-11 show an arrangement in accordance with the present invention with stator-embedded nozzle (wall-flush) and fluid supply via the stator root, view A-A in FIG. 7a, FIGS. 12-15 show an arrangement in accordance with the present invention with stator-embedded nozzle (protruding) and fluid supply via the stator root, meridional view and perspective view of stator variants.
Figure 11:
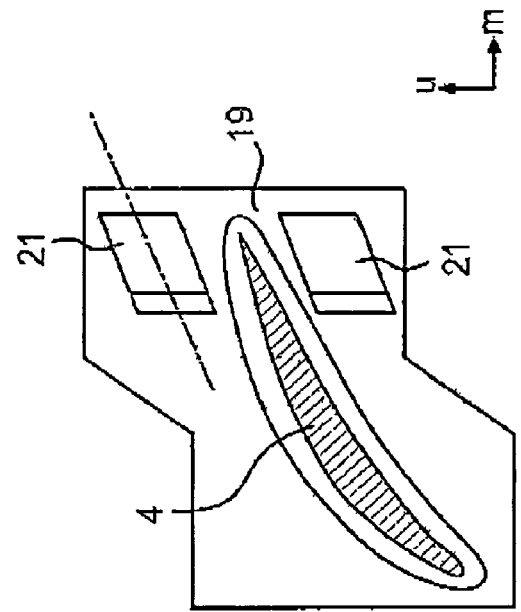
Figure 8:
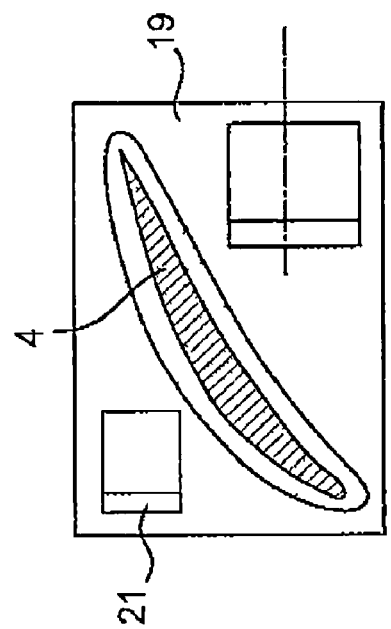
Figure 10:
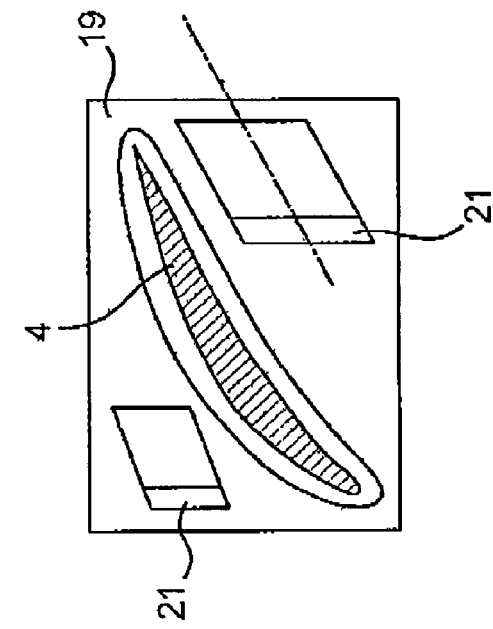

FIGS. 7a and 7b show an inventive arrangement of a stator 4 with a subsequent rotor 7, surrounded by a casing 2. Accordingly, the figure shows an arrangement with stator-embedded nozzle (wall-flush) and fluid supply via the stator root in meridional view and a three-dimensional view of the stator. The stator 4 is firmly connected to the casing 2. In the representation selected, the rotor 7 has a running gap between its blade tips and the casing 2, however, the present invention also provides for rotor designs with tip-shrouded blades. The stator root 19 and the casing 2 form a fluid supply chamber 20 which issues into the main flow path via a flow passage and a nozzle 21. Here, the nozzle 21 is completely embedded into the stator component and has a wall-flush configuration with particularly low flow disturbance. Accordingly, fluid flows from the supply chamber 20 via the vane root (stator root 19) into the main flow path and towards the tip of the rotor 7. For further clarification, a stator vane is shown in perspective view on the right side of the figure. The leading edge is designated with reference numeral 22. In this and the following illustrations, the individual blade with root is to be considered either as a separate component or as part of a larger vane assembly.

FIGS. 8-11 show various nozzle arrangements enabled by the present invention in meridional section A-A (a plane formed by meridional direction m and circumferential direction u) with view onto the vane root (stator root 19). Accordingly the figure shows an arrangement with stator-embedded nozzle (wall-flush) and fluid supply via the stator root, according to the sectional view A-A of FIG. 7a. The upper left representation applies to a meridional nozzle orientation, the upper right representation to an oblique nozzle orientation, both bottom representations apply to a sheared nozzle orientation. The nozzle 21 can a have a rectangular or a sheared layout, be positioned on the pressure side or the suction side of the profile, and be inclined in the meridional direction or against the meridional direction by the angle beta. No specification is made with regard to the root platform of the stator 4, with a rectangular platform and an obliquely stepped platform being shown as examples. Preferably, the exit of the nozzle 21 is to be arranged near the trailing edge plane of the stator 4. The position of the nozzle is confined by the rims of the stator root 19. It extends over part of the circumference. In accordance with the present invention, the wall-flush nozzle 21 can either be mechanically or electrochemically machined directly into the material of the stator 4 or be created by means of inserts in the vane root (stator root 19).

FIGS. 12-15 show an alternative arrangement according to the present invention of a stator 4 with a downstream rotor 7. The figure details an arrangement with stator-embedded nozzle (protruding) and fluid supply via the stator root in meridional view as well as perspective views of stator variants. As in the examples described above, fluid is supplied into the fluid supply chamber 20. Again, the nozzle 21 is fully embedded into the stator component, but has a protruding, aerodynamically safely controllable configuration. The nozzle exit is here on the side of the vane root (stator root 19) looking into the main flow direction. For further clarification, various variants of a stator vane provided by the present invention are shown in perspective view on the right-hand side of the figure. Here, an elevation of the platform required for the nozzle protrusion may occur on the entire circumference or only on part of the circumference. In particular, the nozzle can be open towards one side of the stator platform (stator root) to enable connection to the root (and nozzle, if applicable) of an adjacent stator vane or stator vane assembly.

Figure 16:
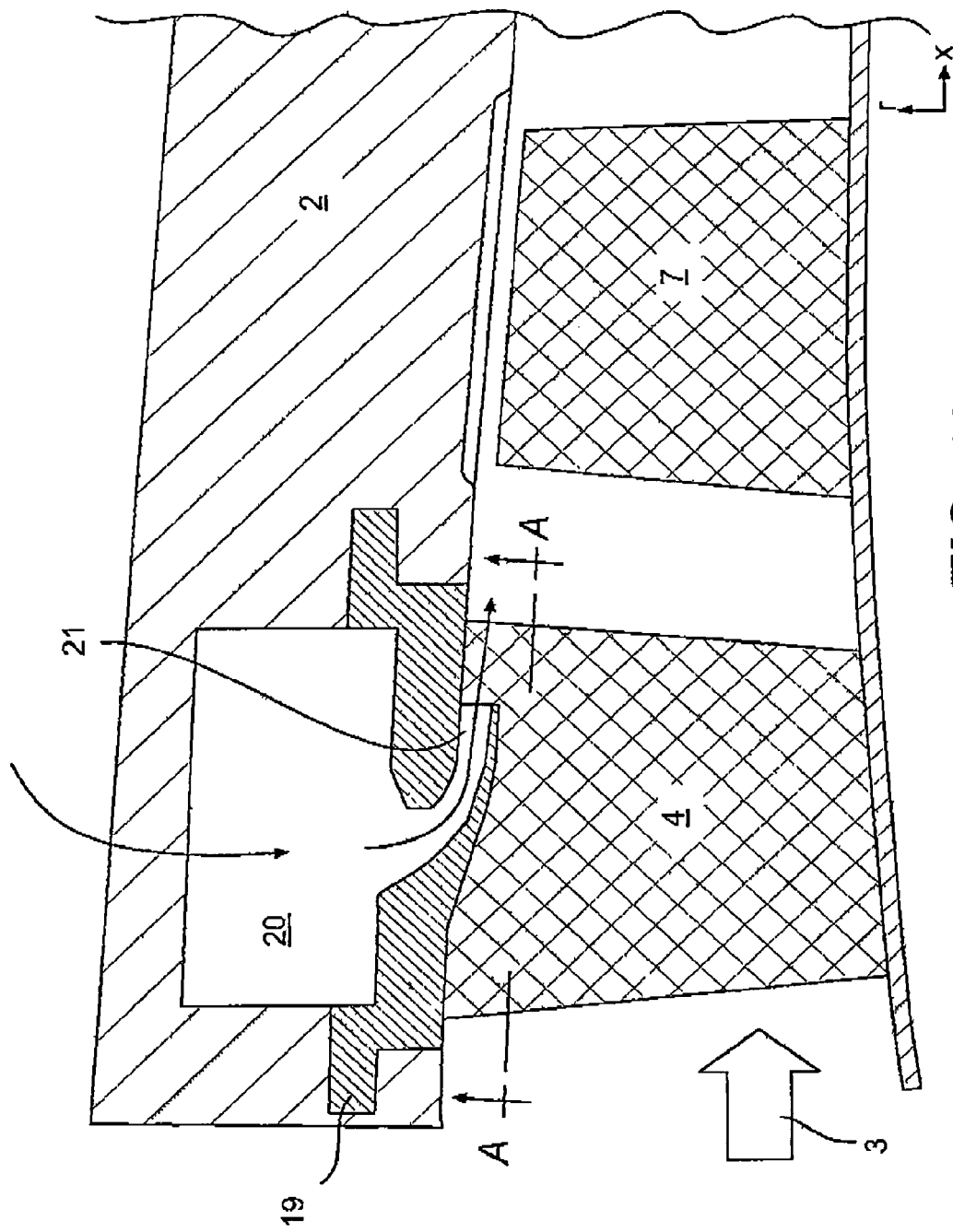
FIG. 16 shows an alternative arrangement in accordance with the present invention with stator-embedded nozzle (protruding) and fluid supply via the stator root, meridional view.
Figure 17:
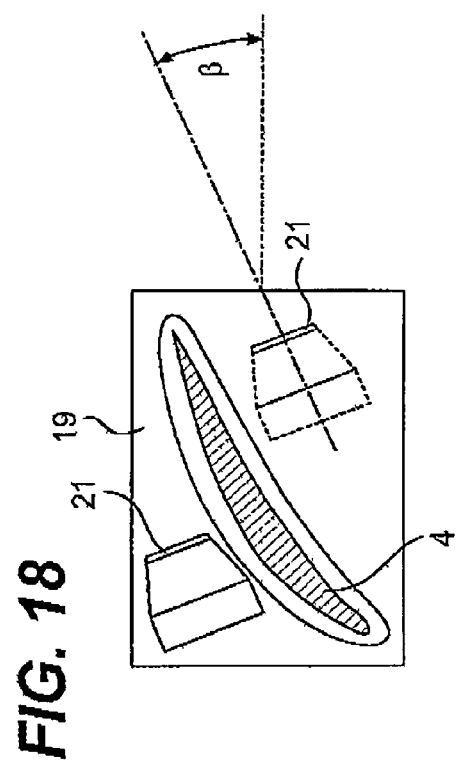
FIGS. 17-20 show an alternative arrangement in accordance with the present invention with stator-embedded nozzle (protruding) and fluid supply via the stator root, view A-A in FIG. 16, FIGS. 21-22 show an alternative arrangement in accordance with the present invention with stator-embedded nozzle (protruding) and fluid supply via the stator root, perspective view of stator variants.
Figure 18:
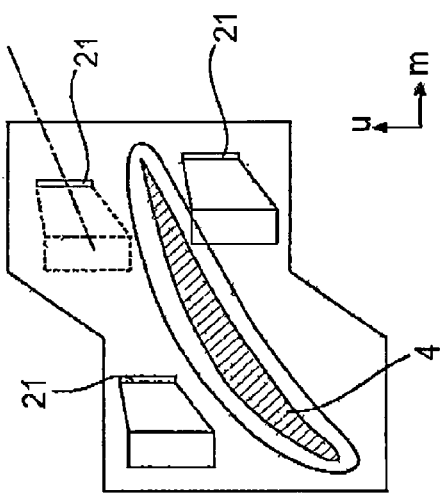
Figure 19:
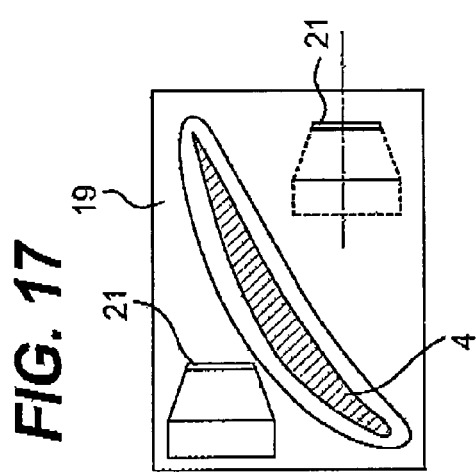
Figure 20:
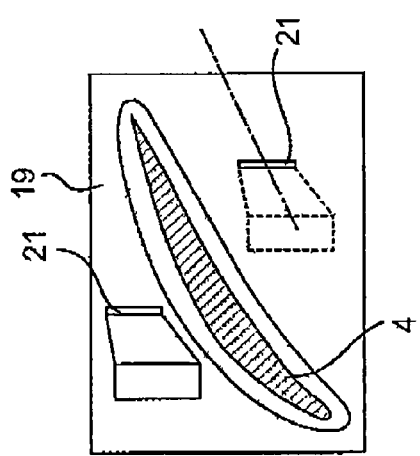

FIG. 16 shows an alternative arrangement according to the present invention in which the nozzle 21 is again fully embedded into the stator component, has a protruding configuration, but is arranged within the stator passage. Specifically, an arrangement with stator-embedded nozzle (protruding) and fluid supply via the stator root is shown in meridional view.

In correspondence with the meridional view A-A in FIG. 16, FIGS. 17-20 shows a view (a plane formed by meridional direction in and circumferential direction u) onto the vane root (stator root 19) of various nozzle arrangements enabled by the present invention. More particularly, an arrangement with embedded nozzle (protruding) and fluid supply via the stator root is shown. The upper left view shows a meridional nozzle orientation, the upper right view an oblique nozzle orientation, and the two bottom views show a sheared nozzle orientation. The nozzle 21 can have a symmetrical or non-symmetrical layout, be positioned on the pressure side or the suction side of the profile, and be inclined in or against the meridional direction by the angle beta. No specification is made with regard to the root platform of the stator 4, with a rectangular platform and an obliquely stepped platform being shown as examples.

Figure 22:
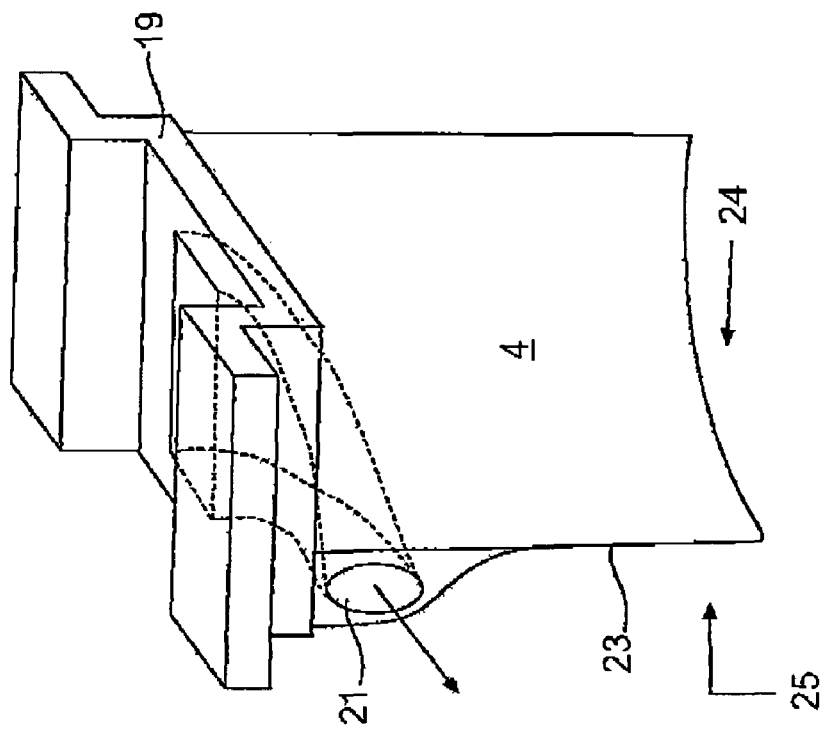
Figure 21:
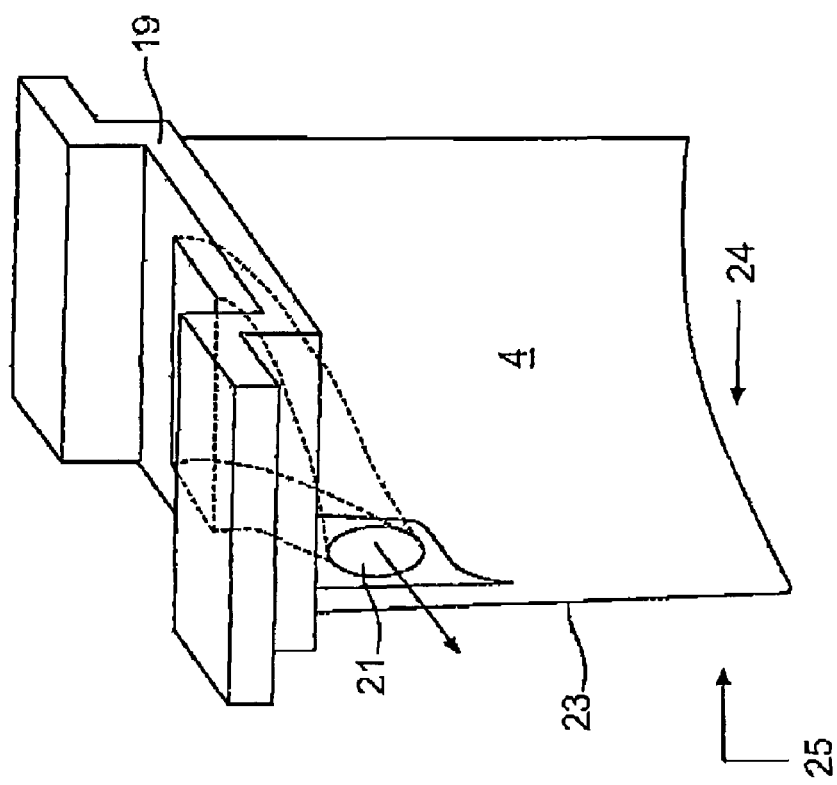

FIGS. 21-22 shows two variants of the solution according to the present invention with adjacency of nozzle exit to the suction side or to the pressure side of the stator vane. The left-hand illustration shows pressure-side adjacency, while the right-hand illustration shows suction-side adjacency of the nozzle exit. The trailing edge of the stator is indicated with the reference numeral 23, with the arrowhead 24 showing the pressure side and the arrowhead 25 the suction side.

FIGS. 23-24 shows an inventive arrangement of a variable stator with a downstream rotor, surrounded by a casing. The figure details an arrangement with stator-embedded nozzle (wall-flush) and fluid supply via the actuating shaft of the stator in meridional view as well as a three-dimensional view of the stator. Also in this example, fluid is supplied to the fluid supply chamber 20. In the perspective representation, reference numeral 22 designates the leading edge and reference numeral 23 the trailing edge of the Stator 4. The stator is rotatably borne within the casing. For further clarification, a stator vane is shown in perspective representation on the right-hand side of the figure. Adjacent to the actuating shaft, a fluid supply chamber is provided by the casing which issues into the main flow path via a flow passage extending through the hollow actuating shaft, the round stator root and a nozzle. Here, the nozzle is completely embedded into the stator component and has a wall-flush configuration with particularly low disturbance. Accordingly, fluid flows from the supply chamber via the vane root (stator root 19) into the main flow path and towards the tip of the rotor. Preferably, the nozzle exit is arranged near the trailing edge plane of the stator. Nozzle position is confined by the rims of the stator root. It extends over a part of the circumference. In accordance with the present invention, the nozzle can either be machined directly into the material of the stator by a mechanical or electrochemical process or be formed by inserts in the vane root (stator root 19).

FIGS. 25-26 show an arrangement with protruding nozzle of a variable stator with a subsequent rotor according to the present invention. Clarity is provided by the three-dimensional representation of the variable stator in the right-hand half of the figure. Accordingly, the figure shows an arrangement with stator-embedded nozzle (protruding) and fluid supply via the actuating shaft of the stator in meridional view.

Figure 28:
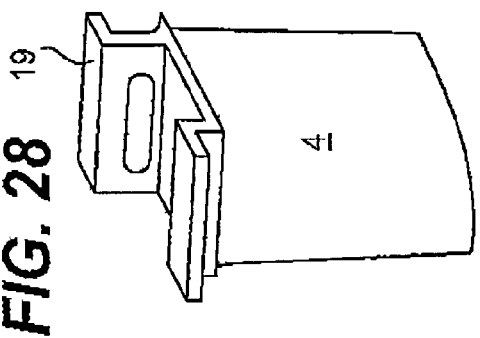
FIGS. 27-29 show an arrangement in accordance with the present invention with stator-adjacent nozzle (wall-flush) and fluid supply via the stator root, meridional view and perspective view of stator variants.
Figure 29:
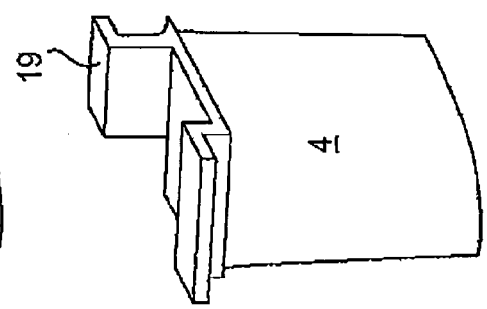
Figure 27:
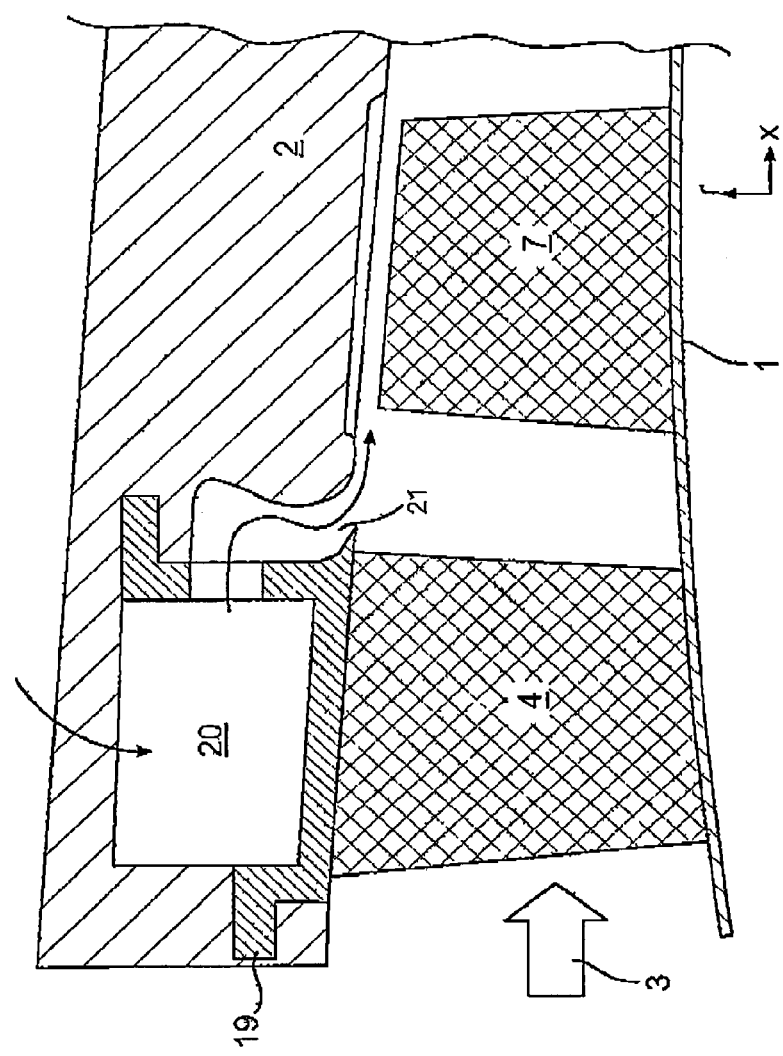

FIGS. 27-29 shows an arrangement according to the present invention of a stator 4 with a downstream rotor 7, surrounded by a casing. The arrangement shows a wall-flush, stator-adjacent nozzle and a fluid supply via the stator root, also in meridional view. The stator 4 is firmly connected to the casing 2. The stator root 19 and the casing 2 form a fluid supply chamber 20 which initially connects, via an opening, to a cavity formed jointly by the stator 4 and the casing 2. A subsequent nozzle 21 is also partly confined by the stator 4. The nozzle 21 has a wall-flush configuration with particularly low disturbance. Accordingly, fluid flows from the supply chamber via the vane root (stator root 19) and the stator-adjacent nozzle 21 into the main flow path and towards the tip of the rotor 7. For further clarification, two possible variants of the stator vane are shown on the right-hand side of the figure in three-dimensional representation. As can be seen, the opening in the stator root 19 required for feeding the stator-adjacent nozzle 21 is realizable either by a hole in the flank of the root or by a partial recess of the flank itself.

Figure 30:
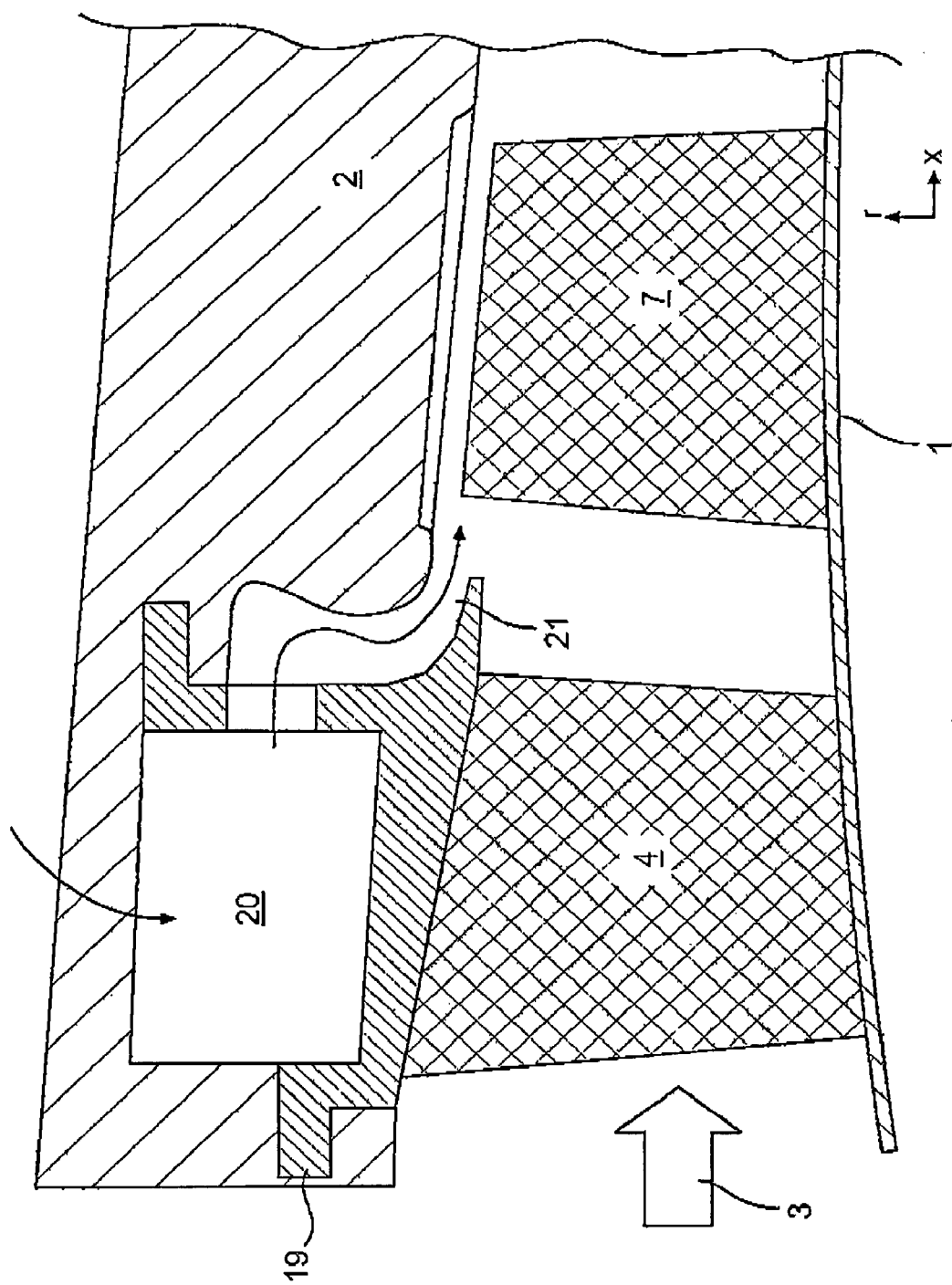
FIG. 30 shows an arrangement in accordance with the present invention with stator-adjacent nozzle (protruding) and fluid supply via the stator root, meridional view.

FIG. 30 shows an arrangement according to the present invention for the case of a protruding nozzle 21 which is arranged adjacent to the stator and is supplied with fluid via the stator root.

Figure 32:
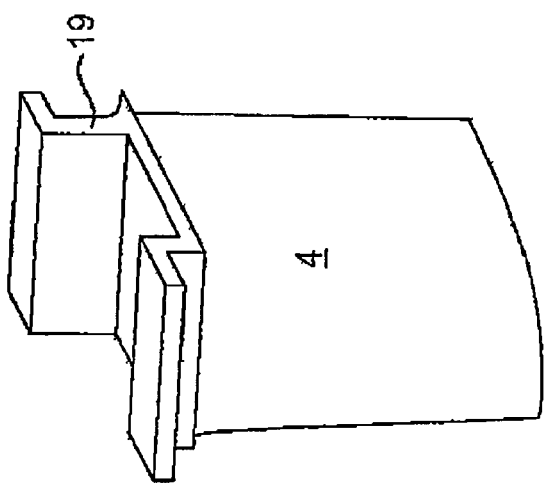
FIGS. 31-32 show an arrangement in accordance with the present invention with stator-adjacent nozzle (wall-flush) and fluid supply via the casing periphery, meridional view and perspective view of the stator.
Figure 31:
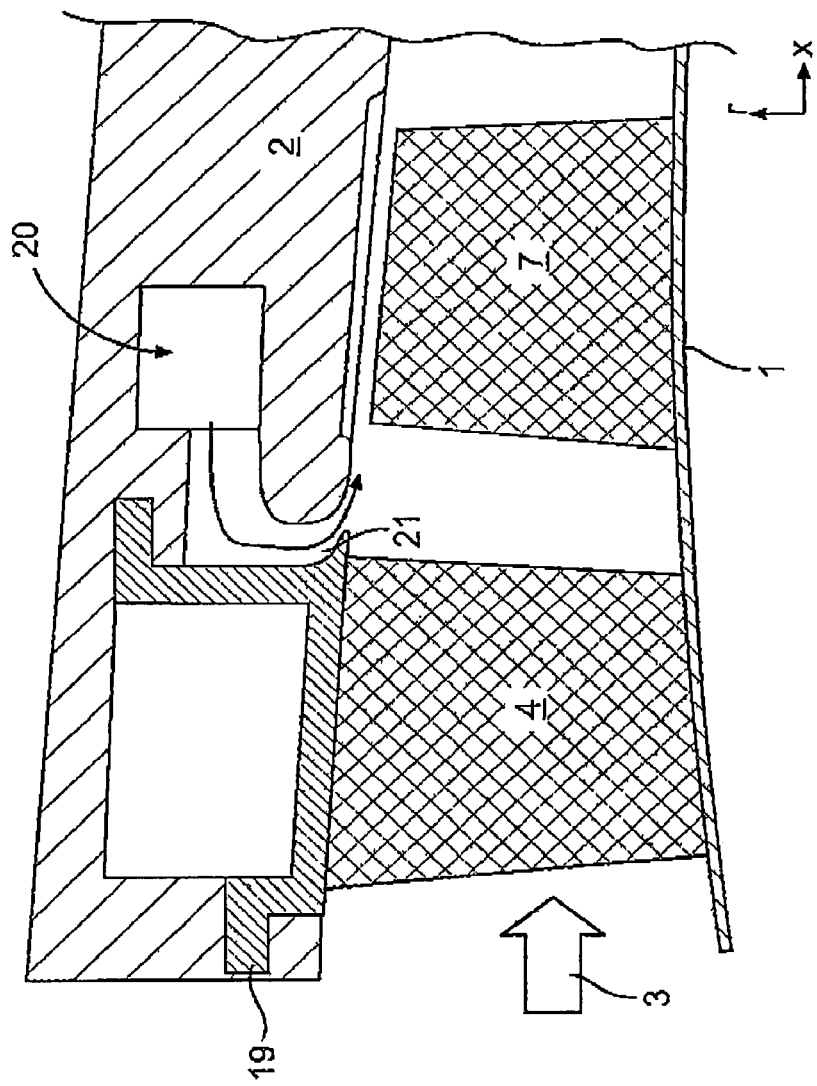

FIGS. 31-32 shows an arrangement according to the present invention for the case of a wall-flush, stator-adjacent nozzle 21 which is fed via a fluid supply chamber in the casing periphery.

Figure 33:
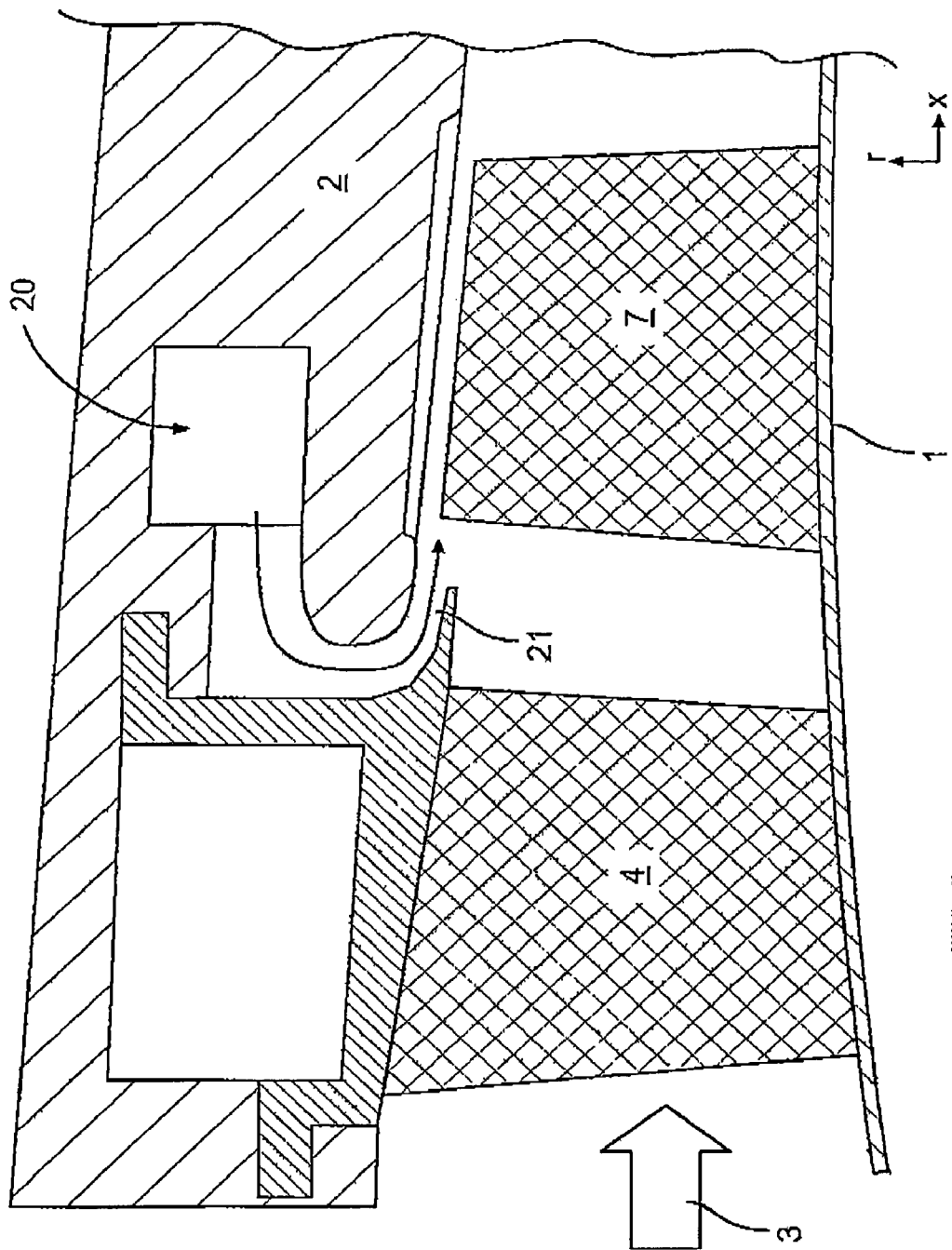
FIG. 33 shows an arrangement in accordance with the present invention with stator-adjacent nozzle (protruding) and fluid supply via the casing periphery, meridional view.

FIG. 33 shows an arrangement according to the present invention for the case of a protruding, stator-adjacent nozzle 21 which is fed via a fluid supply chamber in the casing periphery.

Figure 34:
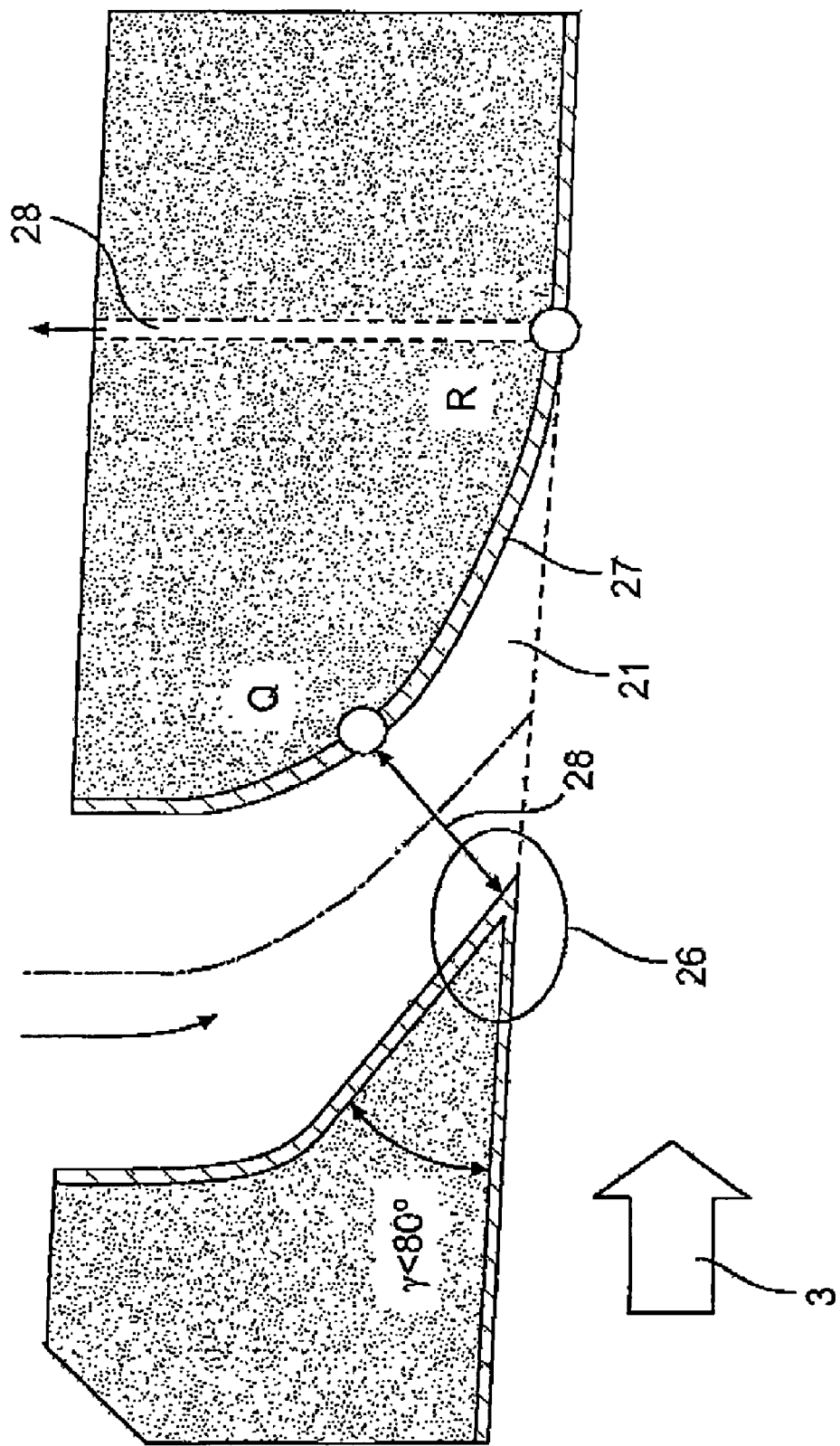
FIG. 34 shows a wall-flush type of nozzle with direct mouth at the main flow path.

It is particularly advantageous if the wall-flush nozzle 21 is designed to further rules. FIG. 34 shows a highly enlarged representation of the nozzle mouth at the main flow path. Accordingly, the left-hand contour of the nozzle should be inclined to the annulus contour by an angle gamma <80°. The resultant tip 26 can be left sharp-edged, be chamfered or rounded. The right-hand contour 27 of the nozzle 21 should, towards the fluid-wetted side, be completely convex between the point Q on the throat of the nozzle 21 and the point of transition into the annulus contour R. It can be particularly favorable to provide a small duct 28, small if compared to nozzle 21, for fluid extraction in close vicinity of point R. Reference numeral 28 indicates the nozzle throat at the end of the upstream nozzle wall.

Figure 35:
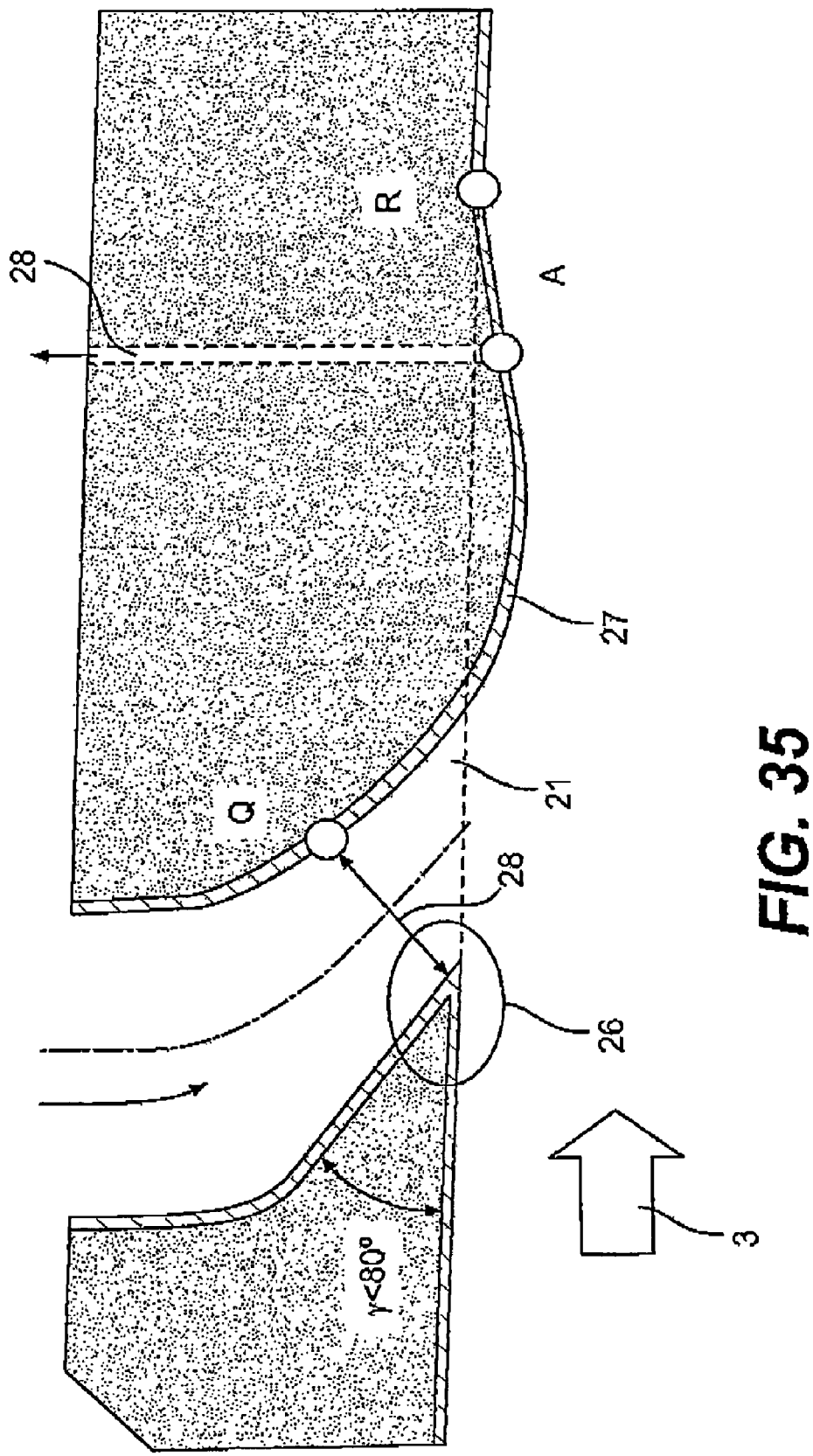
FIG. 35 shows a wall-flush type of nozzle with overshooting mouth at the main flow path.

As shown in FIG. 35, it can be particularly favorable to allow the right-hand contour of the nozzle 21 to overshoot beyond the annulus contour to a certain degree before it connects to point R. In this case, the completely convex contour section 27 ends at point A, which is located before point R. In the case of an overshooting entrance of the nozzle 21, a possible extraction point could be located in close vicinity of point A of the curvature change.

The inventive turbomachine accordingly provides a yet unequalled degree of space-saving peripheral flow influencing, which, moreover, enables the constructional effort and cost (less variable stators and interstage bleed) to be significantly reduced beyond a level that would required with state-of-the-art machinery to provide adequate operational safety. This is possible for various types of turbomachines, such as blowers, compressors, pumps and fans. Depending on the degree of utilisation of the concept, a reduction in cost and weight of the turbomachine between 10 and 20 percent is achievable. Furthermore, the improvement in efficiency provided by the present invention is estimated at 0.2 to 0.5 percent.

LIST OF REFERENCE NUMERALS

1 Hub
2 Casing
3 Main flow direction
4 Stator
5 Stator
6 Stator
7 Rotor
8 Rotor
9 Fluid bleeding device
10 Actuating shaft of the stator
11 Stator-integrated peripheral jet creation
12 Line
13 Chamber
14 Filter device
15 Throttling device/valve
16 Mechanism
17 Annulus
18 Machine axis
19 Stator root
20 Fluid supply chamber
21 Nozzle
22 Leading edge
23 Trailing edge
24 Pressure side
25 Suction side
26 Tips
27 Contour section
28 Duct

What is claimed is:

1. A turbomachine comprising:
   at least one stator and at least one downstream rotor, with the stator comprising stationary stator vanes and the rotor comprising several rotor blades attached to a rotating shaft,
   a casing confining in an outward direction, a passage of a main flow path of fluid through the rotor and the stator, the stator and rotor acting to increase pressure of the fluid along the main flow path,
   a passageway for the supply of peripheral jet fluid, the passageway passing through the casing and radially inwardly through a root of a vane of the stator mounted within the casing, the passageway connecting to a source of peripheral jet fluid from the main flow path at a point downstream of the at least one downstream rotor where a pressure of the fluid is greater than at the at least one stator; and
   a nozzle positioned in the stator vane and connected to the passageway to receive the peripheral jet fluid, the nozzle having an exit opening positioned to issue the peripheral jet fluid at or upstream of a trailing edge of an aerofoil portion of the stator vane at a radially outer boundary of a main flow path to create a peripheral jet generally parallel with a radially outer flow of the main flow path;
   wherein an angle of the nozzle is variable together with the vane of the stator.

2. A turbomachine in accordance with claim 1, wherein the nozzle is formed in the root of the stator vane.

3. A turbomachine in accordance with claim 1, wherein the nozzle is arranged at least one of a pressure side and a suction side of a profile of the vane of the stator.

4. A turbomachine in accordance with claim 1, wherein a downstream contour of the nozzle is completely convex between a point on a throat of the nozzle and a point of transition into a contour of a casing annulus.

5. A turbomachine in accordance with claim 1, wherein an upstream contour of the nozzle is inclined to a contour of a casing annulus by an angle <80°.

6. A turbomachine in accordance with claim 1, wherein the nozzle includes a portion having a decreasing cross-section and a portion curving from a radial direction to a direction of the main flow path.

7. A turbomachine comprising:
   at least one stator and at least one downstream rotor, with the stator comprising stationary stator vanes and the rotor comprising several rotor blades attached to a rotating shaft,
   a casing confining a passage of fluid through the rotor and the stator in the outward direction,
   a nozzle positioned in an area of at least one vane of the stator and issuing fluid at a radially outer boundary of a main flow path to create a peripheral jet, and
   a fluid extraction duct adjacent a downstream edge of the nozzle.

8. A turbomachine comprising:
   at least one stator and at least one downstream rotor, with the stator comprising stationary stator vanes and the rotor comprising several rotor blades attached to a rotating shaft,
   a casing confining a passage of fluid through the rotor and the stator in the outward direction,
   a nozzle positioned in an area of at least one vane of the stator and issuing fluid at a radially outer boundary of a main flow path to create a peripheral jet, and
   a throttling element positioned in a line connected to the nozzle and which is controlled via a mechanical, hydraulic or pneumatic connection to a mechanism for the actuation of variable stators.

9. A turbomachine comprising:
   at least one stator and at least one downstream rotor, with the stator comprising stationary stator vanes and the rotor comprising several rotor blades attached to a rotating shaft,
   a casing confining in an outward direction, a passage of a main flow path of fluid through the rotor and the stator, the stator and rotor acting to increase pressure of the fluid along the main flow path in the outward direction,
   a passageway for the supply of peripheral jet fluid, the passageway passing through the casing and radially inwardly through a root of a vane of the stator mounted within the casing, the passageway connecting to a source of peripheral jet fluid from the main flow path at a point downstream of the at least one downstream rotor where a pressure of the fluid is greater than at the at least one stator, and
   a nozzle positioned in a vane of the stator and connected to the passageway, the nozzle protruding radially inwardly into a radially outer boundary of a main flow path to issue the peripheral jet fluid at or upstream of a trailing edge of an aerofoil portion of the vane of the stator at the radially outer boundary of the main flow path, the nozzle oriented at an angle essentially parallel to the radially outer boundary of the main flow path to create a peripheral jet generally parallel with the radially outer flow of the main flow path;
   wherein an angle of the nozzle is variable together with the vane of the stator.

10. A turbomachine in accordance with claim 9, wherein the nozzle is formed in a root of the stator vane.

11. A turbomachine in accordance with claim 9, wherein the nozzle is arranged at least one of a pressure side and a suction side of a profile of the vane of the stator.

12. A turbomachine in accordance with claim 9, wherein the nozzle includes a portion having a decreasing cross-section and a portion curving from a radial direction to a direction of the main flow path.

13. A turbomachine comprising:
   at least one stator and at least one downstream rotor, with the stator comprising stationary stator vanes and the rotor comprising several rotor blades attached to a rotating shaft,
   a casing confining a passage of fluid through the rotor and the stator in the outward direction, and
   a nozzle positioned adjacent a trailing edge of at least one vane of the stator and issuing fluid at a radially outer boundary of a main flow path to create a peripheral jet generally parallel with the radially outer flow of the main flow path, wherein an angle of the nozzle is variable together with the vane of the stator.

14. A turbomachine in accordance with claim 13, wherein the nozzle is formed in the vane of the stator.

15. A turbomachine in accordance with claim 13, wherein the nozzle is formed in a root of the stator vane.

16. A turbomachine in accordance with claim 13, wherein the nozzle is arranged at least one of a pressure side and a suction side of a profile of the vane of the stator.

17. A turbomachine in accordance with claim 13, wherein a downstream contour of the nozzle is completely convex between a point on a throat of the nozzle and a point of transition into a contour of a casing annulus.

18. A turbomachine in accordance with claim 13, wherein an upstream contour of the nozzle is inclined to a contour of a casing annulus by an angle <80°.

* * * * *